US006374087B1

(12) United States Patent
Gressent et al.

(10) Patent No.: US 6,374,087 B1
(45) Date of Patent: Apr. 16, 2002

(54) SELECTIVE PEAK LIMITER WITH A CIRCULATOR HAVING A THIRD BRANCH HAVING BAND-PASS FILTER, A THRESHOLD ELEMENT AND AN ADAPTED LOAD IN SERIES

(75) Inventors: Joël Gressent, Le Vaudreuil; Pascal Rouet, Gouy, both of (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/217,412

(22) Filed: Dec. 21, 1998

(30) Foreign Application Priority Data

Dec. 23, 1997 (FR) ........................................... 97 16307

(51) Int. Cl.$^{7}$ ........................... H04B 1/46; H04B 1/16; H04J 14/08; G02B 26/00; G02F 1/01

(52) U.S. Cl. ............................ 455/78; 455/80; 455/81; 455/82; 455/217; 359/125; 359/237; 359/341; 370/280; 370/294

(58) Field of Search ............................. 455/78, 81, 82, 455/80, 217; 370/280, 294; 359/176, 237, 341, 125

(56) References Cited

U.S. PATENT DOCUMENTS

| | | | | | |
|---|---|---|---|---|---|
| 4,380,822 | A | * | 4/1983 | Broton | 455/80 |
| 4,641,365 | A | | 2/1987 | Montini, Jr. | 455/78 |
| 5,129,099 | A | * | 7/1992 | Roberts | 455/81 |
| 5,504,609 | A | * | 4/1996 | Alexander et al. | 359/125 |
| 5,652,675 | A | * | 7/1997 | Shibuya | 359/341 |
| 5,781,326 | A | * | 7/1998 | Chiaroni et al. | 359/237 |
| 5,815,803 | A | * | 9/1998 | Ho et al. | 455/78 |
| 5,896,563 | A | * | 4/1999 | Kawanami et al. | 455/82 |
| 5,923,647 | A | * | 7/1999 | Dolman et al. | 370/280 |
| 6,108,313 | A | * | 8/2000 | Lee et al. | 370/294 |
| 6,201,637 | B1 | * | 3/2001 | Nilsson et al. | 359/341 |
| 6,226,275 | B1 | * | 5/2001 | Yang et al. | 370/280 |
| 6,229,992 | B1 | * | 5/2001 | McGeehan | 455/78 |
| 6,272,327 | B1 | * | 8/2001 | Kurchuck et al. | 455/217 |

FOREIGN PATENT DOCUMENTS

| | | | |
|---|---|---|---|
| EP | 0389673 | * | 10/1990 |
| WO | WO 92/00634 | * | 1/1992 |

* cited by examiner

*Primary Examiner*—William Cumming

(57) ABSTRACT

A peak limiter is intended to limit the peak of a signal that has a given frequency, in an assembly comprising other signals of lower amplitude and different frequencies. The peak limiter includes a circulator inserted into a line transporting all the signals. A first branch of the circulator is connected to a line on its upstream side. Its second branch is connected to a line on its downstream side. It's third branch is connected to a reference terminal via the combination of a band-pass filter centered on the given frequency, a threshold element, and an adapted load connected in series.

5 Claims, 1 Drawing Sheet

SELECTIVE PEAK LIMITER WITH A CIRCULATOR HAVING A THIRD BRANCH HAVING BAND-PASS FILTER, A THRESHOLD ELEMENT AND AN ADAPTED LOAD IN SERIES

FIELD OF THE INVENTION

The present invention relates to a peak limiter intended to limit the peak of a signal that has a given frequency, in an assembly comprising other signals whose amplitude is lower than that of said signal and whose frequencies are different.

The invention furthermore relates to a network for distributing television signals by cable, comprising an arrangement for processing telephone signals, for example, of the GSM type, which arrangement includes, inter alia, a transceiver antenna and a circuit separating a receive channel from a transmit channel, the arrangement including a peak limiter in the receive channel.

BACKGROUND AND SUMMARY OF THE INVENTION

U.S. Pat. No. 4,641,365 describes a diplexer system having a transmit and a receive branch, which system comprises a peak limiter placed in its receive branch; this peak limiter is formed by only two diodes arranged in inverse parallel relationship without frequency selectivity.

It is an object of the invention to provide a frequency-selective peak limiter which is simple and has high performance.

For this purpose, the peak limiter comprises, inserted into a line transporting all the signals, a circulator whose first branch is connected to the line on its upstream side, whose second branch is connected to the line on its downstream side and whose third branch is connected to a reference terminal via the combination of a band-pass filter centered on said given frequency, a threshold element, and an adapted load connected in series.

Particular embodiments of the peak limiter appear in the dependent claims 2 and 3.

A network for distributing television signals by cable advantageously includes a peak limiter according to the invention inserted into the receive channel, of which the first branch of the circulator is connected to the antenna and of which the second branch is connected to a downstream part of the channel.

A particular embodiment of the network will appear in the dependent claim 5.

These and other aspects of the invention will be apparent from and elucidated with reference to the embodiments described hereinafter.

BRIEF DESCRIPTION OF THE DRAWING FIGURES

DETAILED DESCRIPTION

Figure 1:
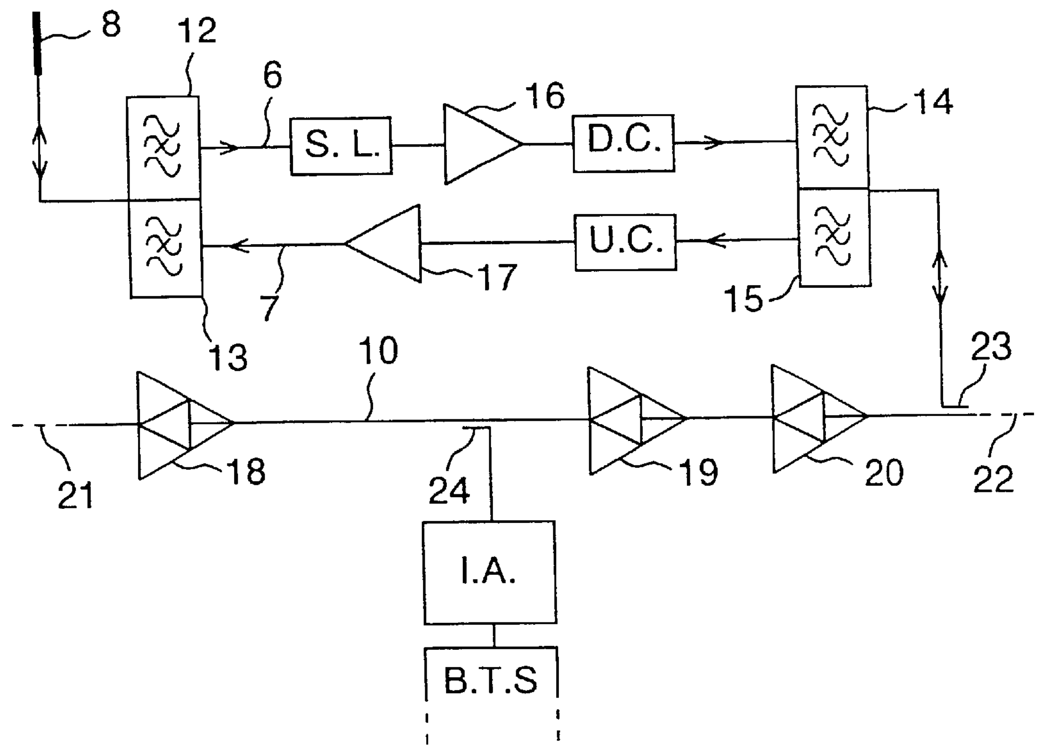
FIG. 1 is a partial diagram of a television signal distribution network including a circuit for the transmission/reception of telephone signals of the GSM type.

The network for distributing television signals by cable of which a part is represented in FIG. 1 comprises a line 10 connected at 21 to a known television broadcast server center (not shown) and at 22 to a known distributor (not shown) serving users. Amplifiers 18, 19, 20 are connected to this line 10; they are of a model for CATV known per se which amplifies in either direction to permit interactivity, that is to say, the return of data from the users to the server.

This television network is arranged for permitting the transport of GSM type of telephone signals. The GSM standard defines two frequency bands of 8 MHz each, one for transmission and one for reception. These two bands are situated just below 1 GHz. For bringing the GSM signals onto the line 10, the arrangement comprises an antenna 8, then a filter 12 which allows the frequency band mentioned above to pass for the reception on an adapted coaxial line.

When a GSM mobile requests a link, it transmits a signal having a maximum amplitude at a predetermined frequency and, after a link has been established, it uses a lower amplitude for most of the time. In certain cases, the signal having a maximum amplitude may saturate a receiver system. It is thus necessary to have a selective peak limiter.

Connected to line 6 in a cascade combination are a selective peak limiter S.L, an amplifier 16, a frequency down-converter D.C. which moves the GSM signals to a lower frequency band suitable for the television network, and finally a filter 14 which allows a frequency band to pass that corresponds to the frequencies of the filter 12, after down-conversion in the converter DC. The signals are finally fed to the line 10 by a coupler 23. They are elsewhere taken up by a coupler 24 and applied via an adaptation interface I.A., known per se, to a base transceiver station B.T.S, also known per se, which puts them in shape (demodulation, decoding, error correction) and delivers them in analog form to the switched telephone network.

Telephone signals coming from the switched telephone network are put into shape (modulation, coding, addition of correction codes) by the base transceiver station B.T.S and are fed to the television network at a frequency compatible with this network. These signals intended to be transmitted by the antenna 8 are fed to a line 10 by the coupler 24 and further tapped by the coupler 23 and filtered by a filter 15 which allows them to pass on an adapted coaxial line 7. In this line are placed in cascade a frequency up-converter U.C which brings the signals back into the GSM transmit frequency band, an amplifier 17 and, finally, a filter 13 connected to the antenna 8.

In each band, a GSM transceiver terminal utilizes a particular sub-band; this sub-band may comprise, for example, seven channels whose frequencies are 200 kHz apart. predetermined frequency $F_a$ is reserved for the calls from mobiles to this terminal. The television network is to transmit the seven channels of a sub-band together (after conversion) including the frequency $F_a$. In the off-hook condition, a mobile transmits with a maximum amplitude which is reduced as soon as the terminal detects the call and responds notably by indicating how much the amplitude is to be reduced, which is a function of the quality of the link between the mobile and the terminal. Yet, at the beginning of the transmission, the received signal may be very powerful and disturb the transmission of the other six channels via the television network. Therefore, the selective peak limiter S.L. is provided to prevent this.

Figure 2:
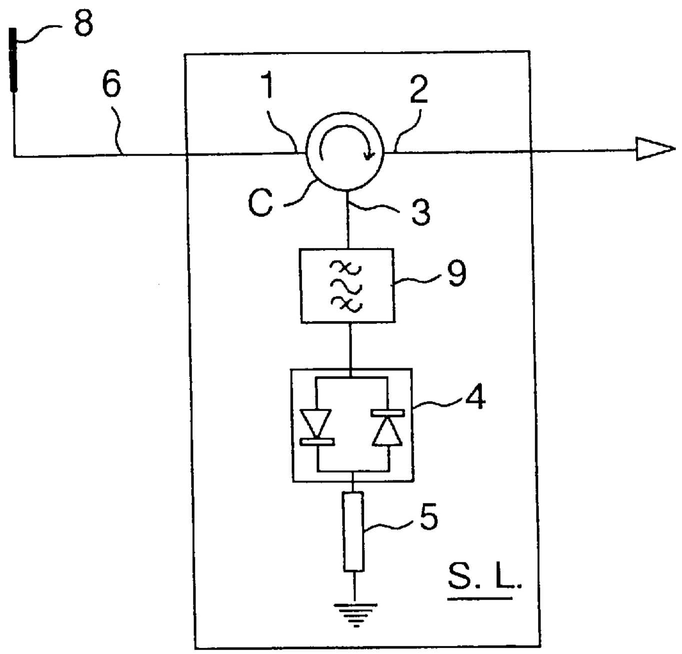
FIG. 2 is a diagram of a selective peak limiter according to the invention.

The selective peak limiter of FIG. 2, situated on line 6, comprises a circulator inserted into the line. The first branch 1 of this circulator is connected to the line 6 on the side of the antenna; the second branch 2 is connected to the downstream channel of the line 6 running to the amplifier 16. The third branch 3 is connected to a reference terminal (ground)

via the series combination of a band-pass filter 9, a threshold element 4 and a load 5.

The reference terminal is ground here, but it could also be, for example, a power source provided that the necessary decouplings are present. The circulator may be a commercially available model having coaxial connectors for the connections of its three branches. The band-pass filter 9 may be a commercially available model, for example with reactances, of a sufficiently high degree. The threshold element 4 is formed here by two Schottky diodes arranged in inverse parallel relationship; it could also be formed by any other known element that becomes conductive over a voltage threshold and that can be used with a frequency of about 1 GHz. The load 5 is a resistor whose nominal value is equal to the characteristic impedance of the line 6 diminished by the dynamic resistance presented by the threshold element when the threshold is surpassed; it could also be, if need be, a more complex element which a person of ordinary skill is able to determine, to perfectly load the circulator.

The operation is based on a particular property of a circulator: the circulator normally transmits a signal from its first branch to its second branch when its third branch is loaded by a non-adapted impedance; on the other hand, it transmits the signal to the third branch when this third branch is adapted. When the frequency is $F_a$, the filter 9 is open and if the amplitude of the signal surpasses the conduction threshold of the diodes, these diodes then exhibit a low dynamic impedance: the third branch of the circulator is then connected to the adapted impedance formed by the load 5, through the filter 9 and the diodes; the signal thus passes from the first branch 1 to the third branch 3. When the frequency is different from the frequency $F_a$, the filter 9 is closed and prevents the third branch of the circulator from being connected to the load 5; there is mismatch and the signal passes from the first branch 1 to the second branch 2. When the amplitude of the signal does not surpass the threshold of the diodes 4, these diodes exhibit a high impedance which still prevents the third branch of the circulator from being connected to the load 5; the signal passes from the first branch 1 to the second branch 2. In conclusion, only a high-amplitude signal having a frequency $F_a$ is directed to the third branch.

What is claimed is:

1. A peak limiter intended to limit the peak of a signal that has a given frequency, in an assembly comprising other signals whose amplitude is lower than that of said signal and whose frequencies are different, characterized in that the peak limiter comprises, inserted into a line transporting all the signals, a circulator whose first branch is connected to the line on its upstream side, whose second branch is connected to the line on its downstream side and whose third branch is connected to a reference terminal via the combination of a band-pass filter centered on said given frequency, a threshold element, and an adapted load connected in series.

2. A peak limiter as claimed in claim 1, characterized in that the threshold element is formed by two diodes arranged in inverse parallel relationship.

3. A peak limiter as claimed in claim 1, characterized in that the load is a resistor whose nominal value is equal to the characteristic impedance of the line diminished by the resistance provided by the threshold element when the threshold is surpassed.

4. A network for distributing television signals by cable, comprising an arrangement for processing telephone signals, which arrangement includes, inter alia, a transceiver antenna and a circuit separating a receive channel from a transmit channel, the arrangement including a peak limiter in the receive channel, characterized in that the arrangement includes a peak limiter as claimed in claim 1, inserted into the receive channel, of which the first branch of the circulator is connected to the antenna and the second branch is connected to a downstream part of the channel.

5. A television signal distribution network as claimed in claim 4, characterized in that the arrangement comprises from the antenna onwards a first filter which allows receive frequencies to pass on a first adapted coaxial line and, from the network onwards, a second filter which allows transmit frequencies to pass on a second adapted coaxial line, the selective peak limiter being placed in the first line.

* * * * *